United States Patent Office 3,758,280
Patented Sept. 11, 1973

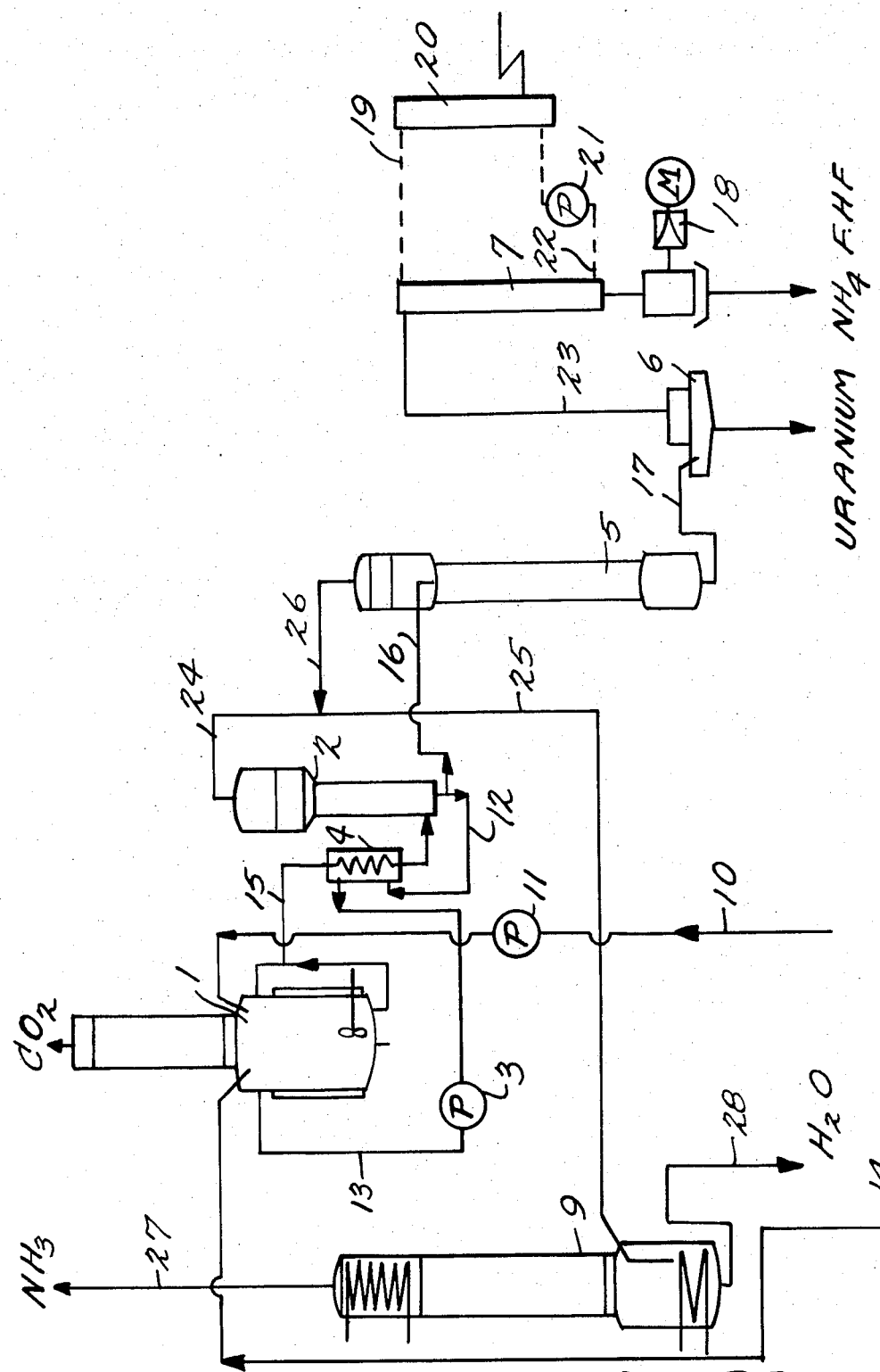

3,758,280
FILTRATE AND WASTE GAS PROCESSING
Hans Pirk, Dornigheim, and Henricus Muller and Karl Hackstein, Hanau am Main, Germany, assignors to Nukem Nuklear-Chemie und -Metallurgie, GmbH, Hanau, Germany
Filed June 23, 1969, Ser. No. 835,509
Claims priority, application Germany, Apr. 23, 1969, P 19 20 479.6
Int. Cl. C01g 43/00
U.S. Cl. 423—15   5 Claims

ABSTRACT OF THE DISCLOSURE

As shown in the single figure of the drawing $NH_3$, $CO_2$, ammonium hydrogen fluoride and uranium are recovered from $NH_4^+$, $CO_3^=$ and fluoride containing waste water as the filtrate from the precipitation of tetraammonium uranyl tricarbonate and $NH_3$ and $CO_2$ containing waste gases from the decomposition of tetraammonium uranyl tricarbonate by employing a circulatory process having a first phase in which the filtrate and waste gases are reacted with a strongly acid solution of ammonium fluoride and ammonium hydrogen fluoride to liberate carbon dioxide and bind ammonia and a second phase wherein the resulting weakly acid carbonate free solution is evaporated to set free ammonia and regenerate the strongly acid solution and a part of the stream of strongly acid solution is withdrawn from the circuit to maintain the fluorine content of the circuit constant and the withdrawn stream is concentrated and the ammonium hydrogen fluoride separated from the uranium material by volatilizing the ammonium hydrogen fluoride.

---

The present invention is directed to a process for the recovery of uranium, ammonium hydrogen fluoride, ammonia, carbon dioxide and water from the filtrates and waste gases which arise in the conversion of monouranium hexafluoride to uranium dioxide by the precipitation of the uranium as tetraammonium uranyl tricarbonate, the so-called AUC, and the associated reductive pyrohydrolysis of this salt.

The considerations which bring about the formation of the waste water (filtrate) and waste gases are of both an economic and an ecological nature.

At a large plant for the production of uranium dioxide the filtrate constitutes the major part of the liquid waste. As a result the environment of the discharge of water has a considerable salt load when the fact is considered that the production of 1000 kg. $UO_2$ necessarily results in the formation of over 800 kg. of ammonium fluoride.

In the same manner, the blowing away of the waste gases leads to an objectionable pollution of the air in the nearest surroundings. Thus, in the production of 1000 kg. of $UO_2$ more than 300 $Nm.^3$ of ammonia escapes. Besides, it is not always possible without a very expensive filter system to avoid the loss of economically not to be overlooked amounts of uranium to the atmosphere.

The change of $UF_6$ to $UO_2$ according to the method indicated in the first paragraph, which in the following description will be designated as "AUC-conversion" goes according to the following reaction equations.

$$UF_6 + 5H_2O + 10NH_3 + 3CO_2 \rightarrow$$
$$(NH_4)_4UO_2(CO_3)_3 + 6NH_4F \quad (I)$$

$$(NH_4)_4UO_2(CO_3)_3 \rightarrow$$
$$UO_3 + 4NH_3 + 3CO_2 + 2H_2O \quad (IIa)$$

$$UO_3 + H_2 \rightarrow UO_2 + H_2O \quad (IIb)$$

From these equations, it is evident that in the overall reaction the $CO_2$ is not consumed and only that portion of the $NH_3$ is consumed which is used to bind the fluorine set free from the $UF_6$. It is obviously desirable, therefore, to recover both of these products and to add them again to the process. This is especially so since in the precipitation I naturally not only the stoichiometric amounts are added but an excess of $NH_3$ and $CO_2$ is used.

The ammonium fluoride which arises according to Equation I and exists in the dissolved form in the filtrate from the precipitate ion is a by-product and after isolation and eventual change to ammonium hydrogen fluoride can find further use.

Furthermore, there are found in the filtrate residues of uranium corresponding to the solubility of the precipitated uranyl salt under the given conditions.

Finally, the water, being a valuable material, since the process is carried out under nuclear-pure conditions, also should be reconditioned and recycled. This is so not only for the filtrate water but also for the water that leaves the pyrohydrolysis in the steam state, especially if these steps (IIa and IIb) are carried out as a fluidized bed where steam is used as the fluidizing gas.

With the process of the invention, it is now possible to recover completely, quantitatively and in an economical manner, all of the compounds contained in the filtrate and the waste gas, either in their original or otherwise usable form.

One can without difficulty devise a number of methods to isolate one or another component of the waste gases or waste water, whether for reutilization or for detoxication.

Thus, there are known processes for the separation of ammonia and carbon dioxide which use aqueous solutions of ammonium nitrate or ethanolamine. The postprecipitation of uranium from the filtrate as $UO_4 \cdot 2H_2O$ with hydrogen peroxide is known.

The ammonia can be set free from the filtrate by admixing with soda lye. The fluorine can be deposited and separated as slightly soluble calcium fluoride.

These and similar processes, however, besides other disadvantages, have in common that they are either excessively expensive in apparatus, as for example the mentioned gas separation, or require the use of enormous quantities of rather expensive adjuvants which are irrecoverably lost. The salt concentration in the waste water increases rather than decreases through treatment of the filtrate with soda lye for the purpose of ammonia recovery, or the use of hydrochloric acid or sulfuric acid for recovery of carbon dioxide. The deposition of calcium fluoride is not a practical method because in a year's production of for example 300 tons of $UO_2$ about 260 tons of $CaF_2$ are precipitated.

Summarizing, it can be said that such processes in the cases at hand for these reasons, and not least because of the relatively small throughput in the $UO_2$ production, do not hold out an exact economical calculation.

The process according to the invention requires no adjuvants. There is relatively little apparatus expenditure and no waste material is productd. For its description, it is advantageous to sketch next the behavior of the filtrate in thermal decomposition.

With warming of the filtrate, there occurs at about 60° C. gas development. Between 60° and 100° C. there escapes a mixture of ammonia, carbon dioxide and steam, which can be condensed by suitable management to dry ammonium carbonate salt.

From 100° C. on the gas phase over the now carbonate free solution consists of ammonia and stream whereby the ratio of ammonia to $H_2O$ in the gas strongly increases with increase in the salt concentration in the solution. It is of fundamental significance for the new process that in this stage of the evaporation a clear, reproducible relation exists between the boiling point and the acidity of the solution. While the fresh filtrate contains 1 to 2.5 N titratable base or free ammonia, the residual solution on reaching a boiling point of 118° C. shows about 3 N free acid.

At about 125° C. an almost water free melt of ammonium fluoride and ammonium hydrogen fluoride exists which by continuing heating gives up more ammonia, until finally, at the latest at 240° C., the boiling point of $NH_4FHF$, the latter salt can be distilled in pure form, whereby the uranium originally in the filtrate remains behind as non volatile $UF_4$ and $UO_2F_2$.

Since the ammonium carbonate obtained by direct distillation from the filtrate is little suited for further use in the conversion, the invention provides for the recovery of ammonia and carbon dioxide as pure gases.

For that purpose, the filtrate is evaporated until a 3 N acid solution arises. Fresh filtrate and waste gas from the pyrohydrolysis of the ammonium uranyl carbonate is led into this solution, namely in such amounts that the pH of the mixture becomes no higher than 6.5. Thereby, the $CO_2$ contained in the filtrate and waste gas is set free quantitatively.

The so obtained weakly acid, carbonate free solution is again evaporated, whereby ammonia and steam escape, which for the purpose of recovering pure ammonia are separated by rectification. When the solution again reaches an acidity of 3 N a part is used to free the next charge of filtrate and waste gas from carbonate.

The remaining part is further evaporated until in the manner described a $NH_4FHF$ melt is obtained which is distilled to separate it from uranium.

In this manner continuously a part of the strongly acid solution is returned for $CO_2$ recovery, while from the other part $NH_4FHF$, uranium fluoride as well as more ammonia and water are obtained.

The single figure of the drawings is a flow diagram for carrying out the process of the invention.

Briefly the drawing described a process in which the filtrate from the precipitation of AUC is pumped into container 1 from conduit 10. The filtrate is mixed in the container with sufficient strongly acid solution from evaporator 2 that the pH value in the stirred container 1 remains at 5.5 to 6.5%. Waste gases can be introduced to the system via conduit 14. Moist $CO_2$ escapes from the top of container 1. The slightly acid solution is lead to circulatory evaporator 2 where strong acid is produced and water and ammonia evaporate. Fluorine values are removed, by passing a part of the solution to column 5 where water and ammonium are volatilized and $NH_4FHF$ precipitated. The fluoride is vaporized and the uranium left behind in shallow evaporator 6. The vaporized $NH_4FHF$ is condensed above its melting point in condenser 7 and recovered on flaking roll 8. The vapors from evaporators 2 and 5 are rectified in column 9, the ammonia going off as tops and the water going off as bottoms.

The procedure of the invention is illustrated in the following examples.

EXAMPLE 1

From the filtrate from the AUC-conversion that contains, for example, 120 grams per liter fluorine, 140 grams per liter $NH_4^+$ and 40 grams per liter $CO_3^=$ as well as 150 mg. per liter of uranium and shows a free base content of 2 N there were evaporated 132 liters. As a result $CO_2$, $NH_3$ and steam escaped. After 35–40 liters had volatilized, the pH value changed into the acid range and by further volatilization sank progressively, when the volume has concentrated to 36 liters, the solution contained 440 grams per liter fluorine and 280 grams per liter $NH_4^+$ at a free acid content of 3 N and a boiling point of 115–118° C. The solution is allowed to cool to about 80° C. and 12 liters of fresh filtrate introduced as well as 5.9 Nm.³ of waste gas from the pyrohydrolysis, namely the amount of waste gas which is given off parallel to 12 liters of filtrate. This 5.9 Nm.³ contains 39.08 mol of $NH_3$, 29.31 mol of $CO_2$ and 195.61 mol of water.

Through this acidification of the basic filtrate as well as through the absorption of $NH_3$ and $H_2O$ from the gas mixture there is set free altogether 37.49 mol of $CO_2$.

There remains behind 50.5 liters of solution containing 342.3 grams of fluorine and 248.7 grams per liter of $NH_4^+$ at an acidity of 0.9 N.

This 50.5 liters of carbonate free solution is again evaporated until the residue has an acidity of 3 N. For this purpose, the volume must be concentrated to 39.27 liters whereby 86.87 mol of ammonia and 627.7 mol of steam are separated by rectification. From the remaining 39.27 l. of 3 N solution which again contains about 440 grams of fluorine per liter, 36 liters were used for reaction with following filtrate and gas charges whereupon the described result was repeated.

The remaining 3.37 liters are for the $NH_4FHF$ production. This amount is further evaporated to 2160 grams of $NH_4FHF$, corresponding to the amount of fluorine contained in 12 liters of filtrate. Thereby a further 1087 mols of $NH_3$ and 82.5 mols of steam are liberated which are fed to the rectification. The $NH_4FHF$ was distilled for recovery of uranium whereby, for example 2.4 grams of $UF_4$ were obtained.

The continuous carrying out of this result is illustrated in Example 2 in connection with the single figure of the drawing.

EXAMPLE 2

The filtrate from the precipitation of AUC that, for example, contains 120 grams per liter of fluorine, 140 grams per liter of $NH_4^+$, 40 grams per liter of $CO_3^=$, as well as 100–200 mg. per liter of uranium was pumped at the rate of 120 liters per hour into a stirring container 1 with a useful volume of 250 liters through conduit 10 with the aid of pump 11. The filtrate was mixed in container 1 with so much strongly acid solution coming from the evaporator 2 via conduit 12, heat exchanger 4, rotary pump 3 and conduit 13 that the pH value in the stirring container remained ≤6.5. If the waste gases from the apparatus (not shown) for pyrohydrolysis of AUC are also treated by introduction through conduit 14, the 59 Nm.³ per hour supply 6.6 kg. per hour of $NH_3$, 12.9 kg. per hour of $CO_2$ and 35.2 kg. per hour of steam it is necessary to add to the container 1 an additional 360 liters per hour of the acid solution. In this case it is appropriate to form the upper part of the stirring container 1 as a contact tower which is sprayed from above with acid solution. There escapes from the stirring container 48–50 kg. per hour of moist $CO_2$ which is otherwise pure and which is stored after drying.

The slightly acid, now carbonate free, solution from container 1 is lead by syphon tube 15 to circulatory evaporator 2 where it is continuously regenerated to a strongly acid solution with a boiling point of 118–120° C. In addition to ammonia about 86 liters per hour of water are evaporated for this purpose. The equation for the reaction in evaporator 2 is $2NH_4F \rightarrow NH_4HF + NH_3$.

From the so obtained 3 N acid solution as said 360 liters per hour are pumped back into container 1. There is set up a circuit in which an acid solution with the aid of the pump, on the one hand, takes up ammonia, fluorine, and supplementary water, but on account of its acid content takes up no $CO_2$ and on the other hand, is freed of the $NH_3$, $H_2O$ and fluorine taken up.

In the heat exchanger 4, the temperature equilibrium is reached between the weakly acid and strongly acid solutions. Accordingly, a temperature of 70–80° C. prevails in container 1. Radiation loss in container 1 is equalized by the heat of neutralization released.

While the solution flowing from container 1, which exhibits an acidity of 0.5–1 N is freed by boiling in evaporator 2 from $NH_3$ and $H_2O$ which has been taken up, the fluorine, normally 14.4 kg. per hour, which is brought into the circuit with the filtrate is drawn off, or the fluorine content of the circuit is held constant, while a corresponding part of the solution, normally 35 liters per hour goes via conduit 16 to column 5 where through a rectification process the water and the over stoichiometric ammonia based on NH₄FHF are evaporated. This column can be laid out as a packed column or as a tube bundle column or according to another trickle film principle. In the sump of this column, which is separately heated, the last residue of the over stoichiometric NH₃ is driven off at 230–240° C. so that per hour 21.6 kg. of an NH₄FHF melt, which now is contaminated only with uranium runs over a syphon tube 17 into the shallow evaporator 6 where the fluoride is vaporized for purpose of purification and goes to conduit 23. The uranium remains behind as fluoride and can be sucked out in the form of a loose powder in regular time intervals. The vaporized NH₄FHF is condensed slightly above its melting point (126° C.) in condenser 7 which is thermostatically controlled with a heat transfer oil and can be carried off by flaking roll 8 driven by motor 18. The heat transfer oil circuit comprises conduit 19, cooler 20, pump 21 and conduit 22.

The vapors from evaporator 2 were conducted via conduits 24 and 25 and the vapors from evaporator 5 were conducted via conduits 26 and 25 to rectifying column 9 where the NH₃ was separated from the water, the ammonia going off at the top through conduit 27 and the water coming off at the bottom through conduit 28. The water obtained showed a very little ammonia, and can be used again in the precipitation without further purification.

Preferred operating conditions are as follows:
(1) Liberation of CO₂ 50–80° C.
(2) pH of liquid leaving vessel 1 is 5.5 to 6.5.
(3) Temperature in evaporator 2 is 100–125° C.
(4) Acidity developed in evaporator 2 is 2.5–3.5 N.
(5) Fluorine content of solution in evaporator 2 is 300 to 400 grams per liter.

EXAMPLE 3

A gas mixture consisting of NH₃ and CO₂ in a ratio of 1:0.752 by volume is introduced into a stirring container 1 through conduit 14 at a rate of 7.22 Nm.³/h. This container forms part of a circuit containing 1000 l. of an acid, aqueous solution of NH₄F and HN₄HF₂ with a concentration of 400 g./l. fluorine and 284 g./l. Na₄⁺.

This solution being acid, containing in fact 3 N of tritratable acid when entering the container 1, the ammonia from the gas is readily dissolved, whereas the CO₂ escapes quantitatively from the container and is stored after drying.

The absorption of NH₃ lowers the acidity of the solution to 0.7 N. This slightly acid solution is lead by syphon tube 15 at a rate of 1000 l./h. to circulatory evaporator 2, where it is continuously regenerated to a 3 N acid solution with a boiling point of 118–120° C. by evaporation of 1.85 kmol/h. of NH₃ and ca. 10.55 kmol/h. of H₂O. The equation for the reaction in evaporator 2 is again $$2NH_4F \rightarrow NH_4HF + NH_3$$

The remaining 3 N acid solution, ca. 810 l./h., is continuously pumped back into container 1 by way of conduit 12, heat exchanger 4, rotary pump 3, and conduit 13.

In the heat exchanger 4, temperature equilibrium is reached between the slightly acid and strongly acid solutions. Since, however, the loss of heat by radiation from container 1 is exceeded by the heat of neutralisation released by the reaction between NH₃ and the acid solution, container 1 has to be cooled in addition so as to keep the temperature under 80° C., above which point the CO₂ is likely to be contaminated with NH₃.

The mixture of NH₃ and steam, 27.8 Nm.³/h., from evaporator 2 flows via conduits 24 and 25 to rectifying column 9, where the NH₃ is separated from the water, the ammonia going off at the top through conduit 27 to be dried and stored, the water leaving the still through conduit 28.

This water, 190 l./h., is pumped back into container 1, so that both the water content and the fluorine content of the circuit remain overall constant.

What is claimed is:

1. In a process for the simultaneous recovery of NH₃, CO₂ and ammonium hydrogen fluoride from NH₄⁺, CO₃⁼ and fluoride containing filtrate from the precipitation of tetraammonium uranyl tricarbonate the improvement comprising in a first phase of a circulatory process reacting said filtrate with a strongly acid aqueous solution of ammonium fluoride and ammonium hydrogen fluoride, liberating carbon dioxide and binding ammonia and reducing the acidity by such reaction, removing the liberated carbon dioxide from the filtrate, in a second phase of the circulatory process continuously evaporating the weakly acid and carbonate free solution so formed and thereby setting free ammonia, removing the ammonia set free and thereby regenerating the strongly acid solution, maintaining the fluoride content of the circuit constant by withdrawing from the circuit sufficient of the stream of strongly acid solution to prevent increase in fluoride.

2. A process according to claim 1 including the further steps of concentrating the withdrawn stream of strongly acid solution to form a mixture of ammonium hydrogen fluoride and uranium fluoride and volatilizing the ammonium hydrogen fluoride to separate it from the uranium fluoride.

3. A process according to claim 2 wherein ammonia and carbon dioxide containing off gases from the pyrohydrolysis of tetraammonium uranyl tricarbonate are also introduced into the filtrate for reaction with the ammonium fluoride and ammonium hydrogen fluoride.

4. A process according to claim 2 comprising liberating the CO₂ and binding the ammonia at a temperature of 50–80° C. and a pH of 5.5 to 6.5.

5. A process according to claim 2 comprising regenerating the weakly acid solution by heating to 100 to 125° C. to evaporate water and form a solution containing NH₄FHF and NH₄F and having an acidity of 3 to 3.5 N and containing 300–400 grams per liter of fluoride.

References Cited
UNITED STATES PATENTS

| | | | |
|---|---|---|---|
| 2,982,602 | 5/1961 | Sherk et al. | 23—333 |
| 3,029,131 | 4/1962 | Ruhoff et al. | 23—335 |
| 3,100,682 | 8/1963 | Kelmers | 23—333 |
| 3,174,821 | 3/1965 | Opratko et al. | 23—335 |
| 3,265,471 | 8/1966 | Pottier et al. | 23—346 |
| 3,288,569 | 11/1966 | Henrickson et al. | 23—321 |
| 3,394,997 | 7/1968 | Hollander | 23—335 |
| 3,519,403 | 7/1970 | Vietzke et al. | 23—355 |

CARL D. QUARFORTH, Primary Examiner

F. M. GITTES, Assistant Examiner

U.S. Cl. X.R.

423—261, 253